(12) United States Patent
Koyasu et al.

(10) Patent No.: US 8,136,157 B2
(45) Date of Patent: Mar. 13, 2012

(54) PROGRAM PROVIDING DEVICE, STORAGE MEDIUM, AND VEHICLE-MOUNTED INFORMATION SYSTEM

(75) Inventors: Takehiko Koyasu, Tokyo (JP); Atsushi Kohno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1242 days.

(21) Appl. No.: 11/883,241

(22) PCT Filed: Feb. 8, 2006

(86) PCT No.: PCT/JP2006/302181
§ 371 (c)(1),
(2), (4) Date: Jul. 26, 2007

(87) PCT Pub. No.: WO2006/114925
PCT Pub. Date: Nov. 2, 2006

(65) Prior Publication Data
US 2008/0140381 A1    Jun. 12, 2008

(30) Foreign Application Priority Data

Apr. 21, 2005  (JP) ............................... P2005-123916
Aug. 30, 2005  (JP) ............................... P2005-249872

(51) Int. Cl.
*G06F 21/00* (2006.01)
(52) U.S. Cl. ........................................... 726/22; 726/26
(58) Field of Classification Search ................ 726/22, 726/24, 26–30
See application file for complete search history.

(56) References Cited

U.S. PATENT DOCUMENTS

| 7,496,956 B1* | 2/2009 | Viljoen et al. ................... 726/11 |
| 2002/0194474 A1* | 12/2002 | Natsuno et al. ............... 713/168 |
| 2005/0055154 A1* | 3/2005 | Tanaka et al. ................. 701/200 |
| 2006/0161982 A1* | 7/2006 | Chari et al. ..................... 726/23 |
| 2010/0169984 A1* | 7/2010 | Levy ............................... 726/30 |

FOREIGN PATENT DOCUMENTS

| JP | 6-276452 A | 9/1994 |
| JP | 2000-62542 A | 2/2000 |
| JP | 2003-150267 A | 5/2003 |
| JP | 2003-283494 A | 10/2003 |
| JP | 2003-337630 A | 11/2003 |
| JP | 2004-264224 A | 9/2004 |
| JP | 2005-28997 A | 2/2005 |
| JP | 2005-75314 A | 3/2005 |
| JP | 2005-88779 A | 4/2005 |

* cited by examiner

*Primary Examiner* — Gilberto Barron, Jr.
*Assistant Examiner* — Malcolm Cribbs
(74) *Attorney, Agent, or Firm* — Birch, Stewart, Kolasch & Birch, LLP (57) ABSTRACT

A program providing device include an emulation means for emulating a hardware environment and a software environment of a vehicle-mounted information system, a program receiving means for receiving a program which is developed for the vehicle-mounted information system, a constraints holding means 21 for holding, as constraints, resource states and environment conditions of the vehicle-mounted information system, a program execution restricting means 22 for restricting the operation of the program on the basis of the constraints held by the constraint holding means, and a program execution means 112 for executing the program received from the program receiving means by using resources provided by the emulation means according to the restrictions provided by the program execution restricting means.

10 Claims, 7 Drawing Sheets

PROGRAM PROVIDING DEVICE, STORAGE MEDIUM, AND VEHICLE-MOUNTED INFORMATION SYSTEM

FIELD OF THE INVENTION

The present invention relates to a program providing device which checks the security of the operation of a program developed for a vehicle-mounted information system without checking the operation of the program on a real system, and which provides the program for the vehicle-mounted information system, and the vehicle-mounted information system which executes the program provided by this program providing device.

BACKGROUND OF THE INVENTION

Equipment which can be connected to the Internet, such as a personal computer or a mobile phone which have come into wide use in recent years, can download programs from various servers via the Internet. Therefore, anyone can develop a program freely and upload it to a server, and can also download any program uploaded to this server to target equipment to execute it. However, there is a possibility that if downloading and executing a malicious program, a program containing a design error, or the like, the target equipment may malfunction or suffer damage, such as leakage of information in the equipment.

To solve this problem, conventionally, an authentication authority carries out an operation test of a program developed by a program developer, and ensures the security of the operation of the program by adding information indicating permission to access only to a required resource. For example, according to an access control method for use in communication terminals, which is disclosed by patent reference 1, an authentication authority examines a Java (registered trademark, hereafter omitted) application intended for mobile phones, which a content provider makes a request of the authentication authority to authenticate, and, when the authentication authority authenticates that this Java application is an authorized program which satisfies a predetermined operation requirement as a program which accesses resources for which the content provider has applied and which can access the resources, it gives resource specification information specifying the resources to the Java application by using an authentication server. A mobile phone restricts resources which a Java application which is authorized by an authentication authority can access during the application's execution to the resources specified by the resource specification information added to this Java application.

[Patent reference 1] JP, 2003-283494, A

However, from the viewpoint of the security, the operation of a program which is installed in, for example, a vehicle-mounted information system like a car navigation apparatus must be limited according to the operating state of the vehicle, for example, whether the vehicle is traveling or standing still, unlike as in the case of a program installed in a mobile phone. Therefore, the method disclosed by patent reference 1 cannot carry out adequate operation verification and cannot provide appropriate access permission. In order to encourage general and ordinary programmers to develop programs, it is convenient to simultaneously perform both a verification of the operation of a program and a provision of the program which has been verified.

It is therefore an object of the present invention to provide a program providing device suitable for a verification of the operation of a program which is developed for a vehicle-mounted information system, and a provision of the program, and the vehicle-mounted information system which executes the program provided by the program providing device.

DISCLOSURE OF THE INVENTION

In accordance with the present invention, there is provided a program providing device including: an emulation means for emulating a hardware environment and a software environment of a vehicle-mounted information system; a program receiving means for receiving a program which is developed for the vehicle-mounted information system; a constraints holding means for holding, as constraints, resource states and environment conditions of the vehicle-mounted information system; a program execution restricting means for restricting an operation of the program on the basis of the constraints held by the constraint holding means; and a program execution means for executing the program received by the program receiving means by using resources provided by the emulation means according to the restrictions provided by the program execution restricting means.

In accordance with the present invention, there is provided a vehicle-mounted information system including: a program receiving means for receiving a program which is developed for a vehicle-mounted information system, and authentication information; a program authentication means for decrypting the authentication information received from the program receiving means to authenticate the authentication information; a program execution restricting means for restricting an operation of the program according to a result of the authentication received from the program authentication means; and a program execution means for executing the program received from the program receiving means according to the restrictions provided by the program execution restricting means.

In accordance with the present invention, there is provided a storage medium including: an emulation means for emulating a hardware environment and a software environment of a vehicle-mounted information system; a program receiving means for receiving a program which is developed for the vehicle-mounted information system; a constraints holding means for holding, as constraints, resource states and environment conditions of the vehicle-mounted information system; a program execution restricting means for restricting the operation of the program on the basis of the constraints held by the constraint holding means; and a program execution means for executing the program received by the program receiving means by using resources provided by the emulation means according to the restrictions provided by the program execution restricting means.

The program providing device in accordance with the present invention can perform functional checks on a program in an environment like a vehicle-mounted information system using the emulation means by setting up resource states and environment conditions as the constraints. Therefore, the program providing device is suitable for a verification of the operation of the program which is developed for vehicle-mounted information systems, and a provision of the program.

Because the vehicle-mounted information system in accordance with the present invention is so constructed as to restrict the operation of the program on the basis of the received authentication information, even if the verification of the program provided by the program providing device is inadequate, the vehicle-mounted information system can properly execute the program.

BRIEF DESCRIPTION OF THE FIGURES

FIG. 5 is a flow chart showing a procedure for executing a Java application which the car navigation apparatus which is provided as a vehicle-mounted information system in accordance with embodiment 1 of the present invention follows, the Java application being provided by the program providing device;

PREFERRED EMBODIMENTS OF THE INVENTION

The preferred embodiment of the present invention will now be described with reference to the accompanying drawings. Hereafter, a car navigation apparatus will be explained as an example of a vehicle-mounted information system in accordance with the present invention. Furthermore, assume that a program which is developed for the vehicle-mounted information system is a Java application program (referred to as a "Java application" from here on), and a program providing device includes a test program for testing a Java application intended for a car navigation apparatus, the test program running on a personal computer. In addition, assume that the car navigation apparatus can execute only a Java application provided by the program providing device.

Embodiment 1

Figure 1:
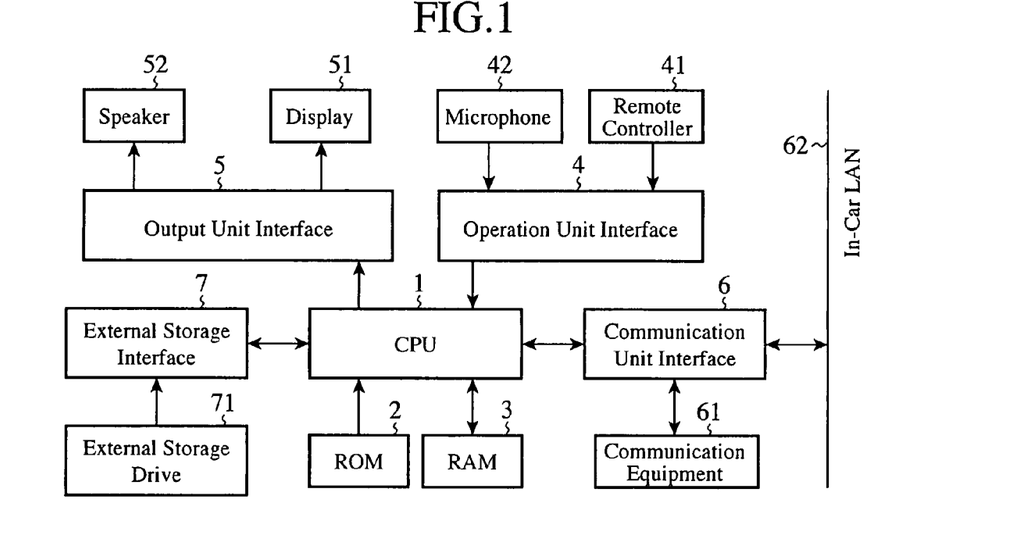
FIG. 1 is a block diagram showing the hardware configuration of a car navigation apparatus which is provided as a vehicle-mounted information system in accordance with embodiment 1 of the present invention.

FIG. 1 is a block diagram showing the hardware configuration of a car navigation apparatus which is provided as a vehicle-mounted information system in accordance with embodiment 1 of the present invention. This car navigation apparatus is provided with a CPU (Central Processing Unit) 1, a ROM (Read Only Memory) 2, a RAM (Random Access Memory) 3, an operation unit interface 4, an output unit interface 5, a communication unit interface 6, and an external recorder interface 7.

The CPU 1 controls the whole car navigation apparatus by carrying out arithmetic processing according to a program stored in the ROM 2. The ROM 2 stores map data and programs (a navigation program and so on). The contents of this ROM 2 can be read by the CPU 1. The RAM 3 is used as a work area for storing data temporarily at a time when a program is executed by the CPU 1.

A remote controller (abbreviated as a "remote control" from here on) 41 and a microphone (abbreviated as a "mike" from here on) 42 are connected to the operation unit interface 4. This operation unit interface 4 carries out a control operation of sending an instruction inputted from either the remote control 41 or the mike 42 to the CPU 1. A display 51 and a speaker 52 are connected to the output unit interface 5. This output unit interface 5 carries out a control operation of sending output data sent from the CPU 1 to both the display 51 and the speaker 52.

Communication equipment 61, such as a mobile phone or DSRC (Dedicated Short Range Communication) vehicle-mounted equipment, and an in-car LAN (Local Area Network) 62 are connected to the communication unit interface 6. The communication unit interface 6 controls communications between the CPU 1 and the communication equipment 61 and communications between the CPU 1 and the in-car LAN 62. The CPU 1 acquires vehicle information, such as the vehicle's speed and remaining amount of fuel, from the in-car LAN 62 via the communication unit interface 6.

An external recorder drive 71 for reading data from a recording medium, such as a CD (Compact Disc) or a DVD (Digital Versatile Disk), is connected to the external recorder interface 7. This external recorder interface 7 controls transmission and reception of data between the external recorder drive 71 and the CPU 1.

Figure 2:
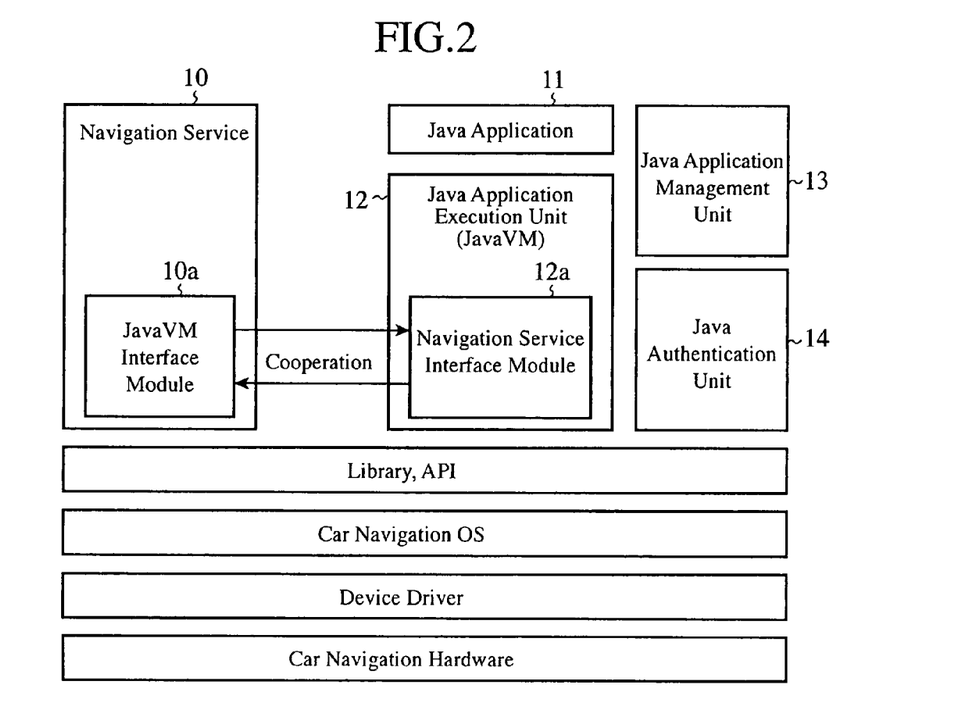
FIG. 2 is a diagram showing the software configuration of the car navigation apparatus shown in FIG. 1.

FIG. 2 is a diagram showing the software configuration of the car navigation apparatus shown in FIG. 1. An operating system (abbreviated as a "car navigation OS" from here on) of the car navigation apparatus is formed on various device drivers for making the hardware (referred to as the "car navigation hardware" from here on) of the car navigation apparatus operate. On a higher layer of this car navigation OS, a library and an application program interface (referred to as an "API: Application Program Interface" from here on) are provided. On a further upper layer, a navigation service 10 constructed of a program, a Java application 11, a Java application execution unit (JavaVM; Java Virtual Machine) 12, a Java application management unit 13, and a Java application authentication unit 14 are disposed.

The navigation service 10 offers basic services of car navigation, such as a service for displaying the current position, and a service for setting up a destination and carrying out route guidance. The Java application 11 is a content, such as a game or a vehicle travel supporting program. The Java application execution unit 12 provides an environment in which the Java application 11 is executed. The Java application management unit 13 manages the whole operation of the Java application 11. The Java application authentication unit 14 authenticates whether the Java application 11 is an authorized one.

The navigation service 10 is provided with a JavaVM interface module 10a. The Java application execution unit 12 has a navigation service interface module 12a. These JavaVM interface module 10a and navigation service interface module 12a communicate with each other so that the navigation service 10 and the Java application execution unit 12 run in cooperation with each other.

Figure 3:
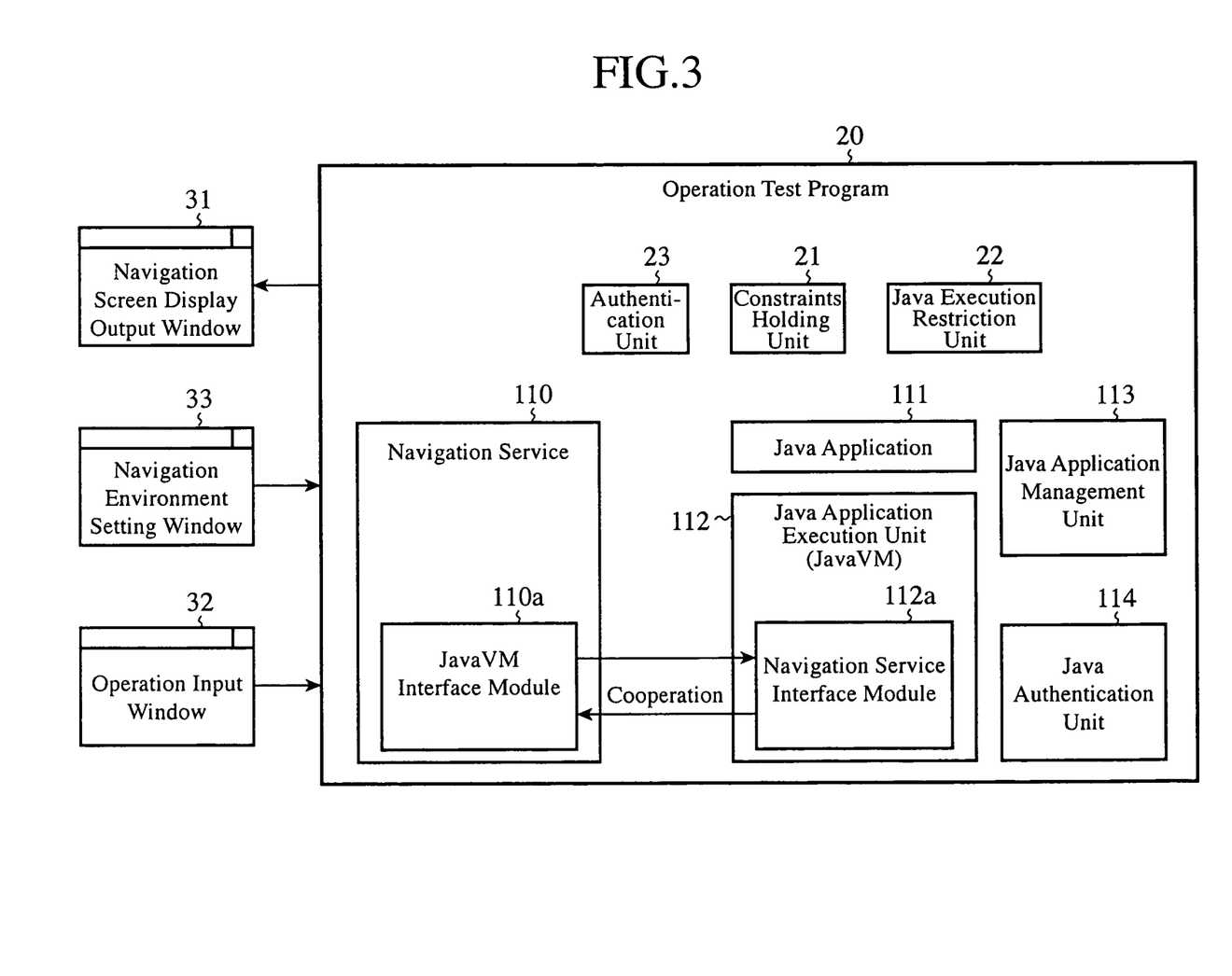
FIG. 3 is a diagram showing the structure of a main portion of a program providing device in accordance with embodiment 1 of the present invention.

FIG. 3 is a diagram showing the structure of a main portion of the program providing device in accordance with embodiment 1 of the present invention. This program providing device is provided with an operation test program 20 which is constructed of a hardware emulator which emulates a hardware environment and a software emulator which emulates a software environment, a navigation screen display output window 31, an operation input window 32, and a navigation environment setting window 33, and is constructed as a program for duplicating the functions of the hardware and software of the above-mentioned car navigation apparatus on a personal computer. The hardware emulator and the software emulator correspond to an emulation means of the present invention.

The operation test program 20 is provided with a constraints holding unit 21, a Java application execution restriction unit 22, and an authentication unit 23 as a structure which does not exist in the actually-implemented car navigation apparatus. Components which exist in the actually-implemented car navigation apparatus are designated by reference numerals each of which is an addition of "100" to a corresponding reference numeral shown in FIG. 1, and each of the components has the same function as that of the actually-implemented car navigation apparatus.

Figure 4:
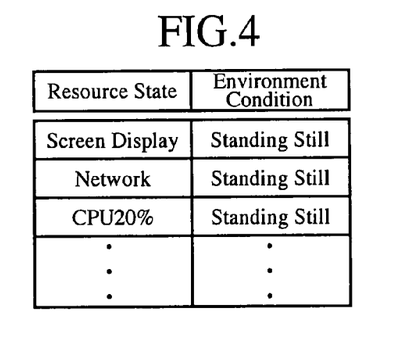
FIG. 4 is a diagram for explaining constraints for use in the car navigation apparatus which is provided as a vehicle-mounted information system in accordance with embodiment 1 of the present invention.

The constraints holding unit 21 corresponds to a constraints holding means of the present invention. Constraints which are beforehand set up by the provider of the operation test program 20 are held by this constraints holding unit 21. This constraints holding unit 21 holds possible resource states and environment conditions of the car navigation apparatus while associating them with each other. For example, as shown in FIG. 4, they are formed as a file in which possible operation states are listed. FIG. 4 shows that, for example, a screen display can be generated only when the vehicle is standing still.

The resource states held as constraints by the constraints holding unit 21 include, as information about hardware resources, at least one of a CPU usage, a memory usage, a hard disk usage (i.e., a program size), a bus usage, enable or disable of use of a network, and so on. Furthermore, the resource states include, as software resources, at least one of enable or disable of use of the API, enable or disable of use of the library, and a state of execution of a specific program. The environment conditions include at least one of a traveling state indicating whether the vehicle is traveling or standing still, the travelling speed, position, direction, and altitude of the vehicle, temperature, humidity, weather, and the road type of the road along which the vehicle is traveling.

The Java application execution restriction unit 22 corresponds to a program execution restriction means of the present invention, and restricts the operation of a Java application which is executed by the Java application execution unit 112 according to the constraints currently held by the constraints holding unit 21. The authentication unit 23 generates authentication information for a Java application on which functional checks have been performed by using a key which is beforehand embedded into the Java application.

The navigation screen display output window 31 is a window for displaying a screen which is to be displayed on the display 51 in the car navigation apparatus on the screen of the personal computer. The operation input window 32 is a window for inputting information which is to be inputted by using either the remote control 41 or the mike 42 in the car navigation apparatus from an input device of the personal computer.

The navigation environment setting window 33 is a window for inputting information indicating an environment condition which is to be acquired from the vehicle in the car navigation apparatus from an input device of the personal computer. The constraints set to the constraints holding unit 21 are beforehand set up by the provider of the program providing device, but cannot be set up by using the navigation environment setting window 33.

Figure 5:
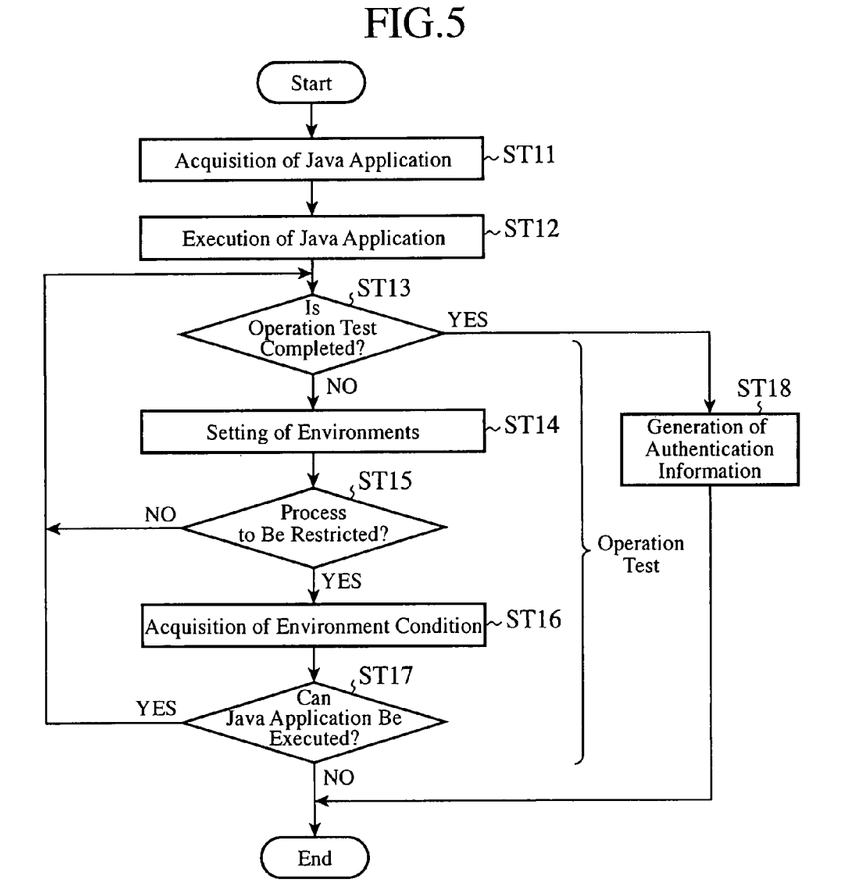
FIG. 5 is a flow chart showing a procedure for executing a developed Java application which the program providing device in accordance with embodiment 1 of the present invention follows.

Next, a procedure for executing a developed Java application by using the above-mentioned operation test program 20 will be explained with reference to a flow chart shown in FIG. 5.

First, a Java application is acquired (step ST11). That is, using a not-shown communication interface which is implemented by the operation test program 20, a Java application is received and is set as a Java application 111 of the operation test program 20. In this case, the not-shown communication interface corresponds to a program receiving means of the program providing device in accordance with the present invention, and the Java application which is received by this communication interface corresponds to a program.

The Java application is then executed (step ST12). That is, the Java application execution unit 112 carries out an operation of executing the Java application 111 set in step ST11. This Java application execution unit 112 corresponds to a program execution means of the present invention.

Whether the operation test has been completed is then checked to see (step ST13). Concretely, whether the operation test which is carried out in various environments through the operation of the navigation environment setting window 33 has been completed is checked to see. In this step ST13, when it is judged that the operation test has not been completed, the setting of environment conditions is carried out (step ST14). In this step ST14, the user can set up various environment conditions using the navigation environment setting window 22. For example, the user can switch between the traveling state and the standstill state, can change the traveling position, altitude and direction of the vehicle, the in-car temperature and humidity and the outside temperature and humidity, and can switch between a state in which the vehicle is traveling along a general road and a state in which the vehicle is traveling along a highway. Furthermore, the user can change emulation environment conditions by, for example, setting the CPU usage to 70%, the memory free space to 1 MB, and the bus usage to 80%, and makes the operation test program carry out an operation test under those emulation environment conditions.

Whether the process is a process to be restricted is then checked to see (step ST15). That is, whether the process is a process which is to be performed on resources which are set up as constraints is checked to see. In this step ST15, when it is judged that the process is not a process to be restricted, the sequence is returned to step ST13 and the above-mentioned process is repeated. In contrast, when, in step ST15, it is judged that the process is a process to be restricted, environment conditions are then acquired (step ST16). That is, the Java application execution unit 112 acquires environment conditions from the navigation service 110.

Whether the Java application can be executed is then checked to see (step ST17). That is, the Java application execution unit 112 checks to see whether the Java application can be executed on the basis of the environment conditions acquired in step ST14. When the Java application execution unit, in this step ST17, judges that the Java application can be executed, the sequence is returned to step ST13 and the above-mentioned process is repeated. In contrast, when the Java application execution unit, in step ST17, judges that the Java application cannot be executed, it ends the process.

When, in above-mentioned step ST13, it is judged that the operation test has been completed, authentication information is generated (step ST18). That is, if it can be checked that the target Java application runs normally after operation tests have been carried out under various environments through the operation of the navigation environment setting window 33, the authentication unit 23 generates authentication information using the Java application. As an authentication method which is executed by the authentication unit 23, a method of writing a signature on the Java application using a key which is beforehand prepared for the authentication unit 23, or a method of encrypting the Java application can be used. In addition, a known technique can be used as a technology for writing a signature on the Java application, and a known technique can be used as a technology for encrypting the Java application. After that, the process is ended.

The authentication unit 23 can be so constructed as to, in this step ST13, generate the authentication information according to the constraints including the resource states containing at least one of the CPU usage, the memory usage, the hard disk usage, the bus usage, and the enable or disable of use of the network, and the environment conditions containing at least one of the traveling state, travelling speed, position, direction, and altitude of the vehicle, temperature, humidity, weather, and the type of the road along which the vehicle is traveling. According to this structure, the authentication unit can authenticate the operation of the target Java application for every factor of the constraints on the hardware.

As an alternative, the authentication unit 23 can be so constructed as to generate the authentication information according to the constraints including the resource states containing at least one of enable or disable of use of the API, enable or disable of use of the library, and the state of execution of a specific program, and the environment conditions containing at least one of the traveling state, travelling speed, position, direction, and altitude of the vehicle, temperature, humidity, weather, and the type of the road along which the vehicle is traveling. According to this structure, the authentication unit can authenticate the operation of the target Java application for every factor of the constraints on the software.

As an alternative, the authentication unit 23 can be so constructed as to generate the authentication information according to the provider of the program. According to this structure, the authentication, unit can generate the authentication information for every target for which the program providing device is provided (for example, for every car maker or every content provider).

The authentication information generated in this step ST18 as well as the Java application can be stored in a not-shown memory together. In this case, the not-shown memory corresponds to a program storage means of the present invention, and the Java application stored in this memory corresponds to a program. The authentication information generated in step ST18 as well as the Java application can be transmitted directly to the car navigation apparatus using a not-shown communication interface which is implemented by the operation test program 20. In this case, the communication interface not shown corresponds to a program transmitting means of the program providing device in accordance with the present invention, and the Java application which is received by this communication interface corresponds to a program.

Figure 6:
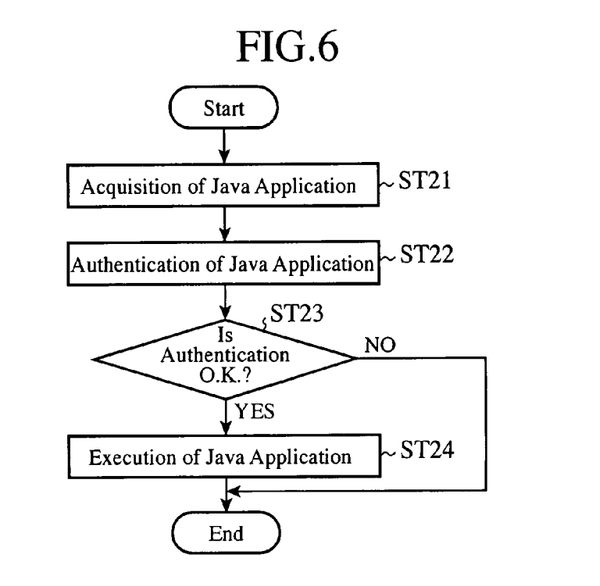

Next, an operation of authenticating authentication information generated according to the above-mentioned procedure, and executing a Java application, which is carried out by the car navigation apparatus will be explained with reference to the flow chart shown in FIG. 6.

First, a Java application is acquired (step ST21) Concretely, the car navigation apparatus receives a Java application and authentication information via the communication equipment 61 (refer to FIG. 1). The received Java application is set as the Java application 11.

The Java application is then authenticated (step ST22) That is, the Java application authentication unit 14 authenticates the received authentication information. This Java application authentication unit 14 corresponds to a program authentication means of the present invention. As an authentication method which the Java application authentication unit 14 uses, either a method of authenticating the signature using a key which is beforehand prepared for the Java application authentication unit 14 or a method of decrypting the Java application encrypted using the key can be used. A known technique can be used as a technology for authenticating the signature, and a known technique can be used as a technology for decrypting the Java application encrypted. The Java application authentication unit 14 sends the authentication result to the Java application execution unit 12.

Whether or not the authentication is proper (O.K.) is then checked to see (step ST23). That is, the Java application execution unit 12 checks to see whether or not the authentication result sent from the Java application authentication unit 14 is proper. When, in this step ST23, judging that the authentication is proper, the Java application execution unit executes the Java application (step ST24). In contrast, when judging that the authentication is not proper (for example, unless the key exists or unless the signature written on the Java program does not match the correct one when the authentication is carried out), the Java application execution unit ends the processing without executing the Java application.

As previously explained, the program providing device in accordance with embodiment 1 of the present invention can check the operation of a program which actually runs in an environment like a car navigation apparatus on a personal computer by setting up resource states and environment conditions as constraints. Therefore, the program providing device in accordance with this embodiment is suitable for a verification of the operation of a program which is developed for car navigation apparatus, and for a provision of a program which is developed for car navigation apparatus. Furthermore, the car navigation apparatus in accordance with this embodiment can prevent an unauthorized Java application from running because it authenticates only a Java application which has been judged to function properly by the operation test program.

Because the program providing device is so constructed as to restrict the use of resources which are emulated by the hardware emulator and the software emulator according to the environment conditions, the program providing device can test a program while restricting the operation of the program according to the operating state of the vehicle, for example, whether the vehicle is traveling or standing still and can carry out an adequate verification of the operation of the program from the viewpoint of the security, unlike as in the case of using the technology disclosed in patent reference 1.

In addition, because the program providing device holds the constraints in the form of a file, the provider of the program providing device can change the contents of the file in order to provide an environment in which the constraints are changed for every target (for example, every car maker, every content provider, and so on) to which the provider provides the program providing device.

Furthermore, because the program providing device is so constructed that the Java application execution unit 112 generates the authentication information authenticating that the Java application is normally executed and provides it as well as the Java application for the user, the user can acquire the program which has been authenticated to have passed the operation test by the program providing device, and can therefore prevent a malicious program and a program containing design errors from being executed by the car navigation apparatus. As a result, this embodiment can prevent damages, such as a malfunction of the equipment and leakage of information in the equipment, from occurring.

In accordance with above-mentioned embodiment 1, the user is allowed to set up various environments for the car navigation apparatus by using the navigation environment setting window 33 to make the program providing device perform functional checks on the target program in the various environments. As an alternative, the program providing device can be so constructed as to automatically perform the setting of environments. For example, the provider of the operation test program 20 prepares data about a test course beforehand, and, if the vehicle is traveling normally while running this test course, the program providing device judges that the Java application runs safely, and generates authentication information.

In addition, in accordance with above-mentioned embodiment 1, the program providing device which is so constructed as to list resource states and environment conditions in the file is shown as an example of holding the constraints. As an alternative, the program providing device can be so constructed as to add the constraints to the Java policy file which is prepared as standard for the access control of Java. Furthermore, the constraints can also be updated by updating this Java policy file by way of the network.

When a maker of car navigation apparatus desires to provide an environment in which a general user can create a Java application for car navigation apparatus of this company, setting of an operating range in which such a general user is allowed to change the constraints can be performed, and an original key of the maker of the car navigation apparatus which corresponds to a key which is embedded into the Java application authentication unit 14 of the car navigation apparatus is embedded into the authentication unit 23 of the operation test program 20 and the operation test program 20 is then distributed. In addition, for regular dealers, the constraints are changed from those provided for general users, and the operation test program 20 is distributed. In this case, it is not necessary to change the key which is embedded into the authentication unit 23 of the operation test program 20. As a result, the car maker can send the operation test program which is suitable for every providing destination only by changing the constraints.

Embodiment 2

In accordance with embodiment 2 of the present invention, constraints are embedded into authentication information. This embodiment 2 differs from embodiment 1 in the authentication method which the authentication unit 23 of the Java application operation test program 20 uses, and the software configuration of the car navigation apparatus. Hereafter, the difference between this embodiment and embodiment 1 will be explained mainly.

The authentication unit 23 of the operation test program 20 which constructs the program providing device in accordance with this embodiment 2 generates authentication information including constraints. For example, when the constraints are held in a file as shown in FIG. 4, the authentication unit 23 encrypts the file and then embeds it into the authentication information.

Figure 7:
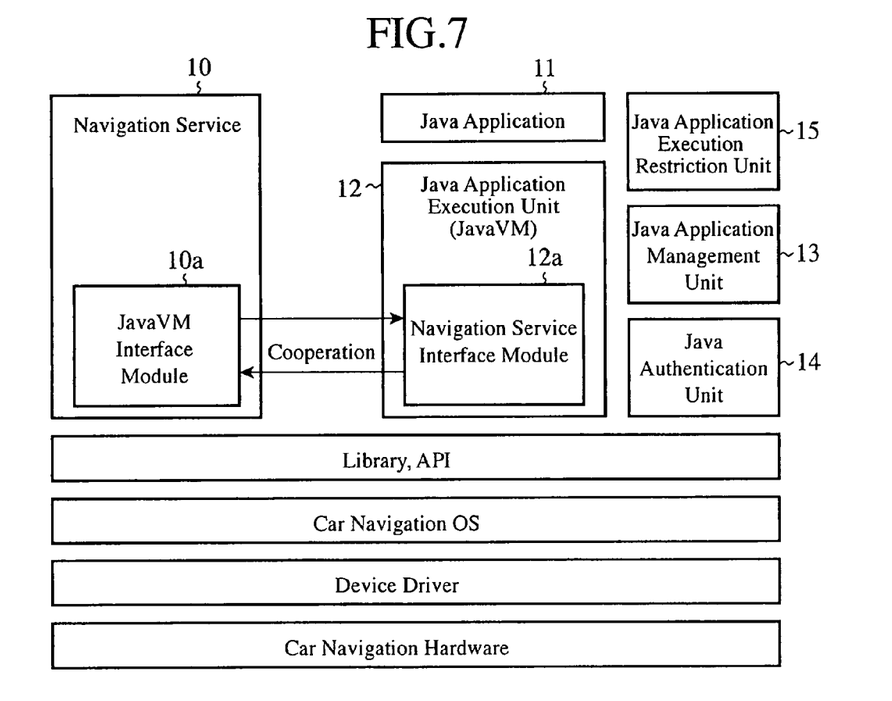
FIG. 7 is a diagram showing the software configuration of a car navigation apparatus which is a vehicle-mounted information system in accordance with embodiment 2 of the present invention.

FIG. 7 is a diagram showing the software configuration of the car navigation apparatus in accordance with embodiment 2 of the present invention. This software configuration is constructed in such a way that a Java application execution restriction unit 15 is added to the software configuration of the car navigation apparatus in accordance with embodiment 1. In embodiment 1, the Java application execution restriction unit is included only in the operation test program 20, but it is not included in the car navigation apparatus.

Figure 8:
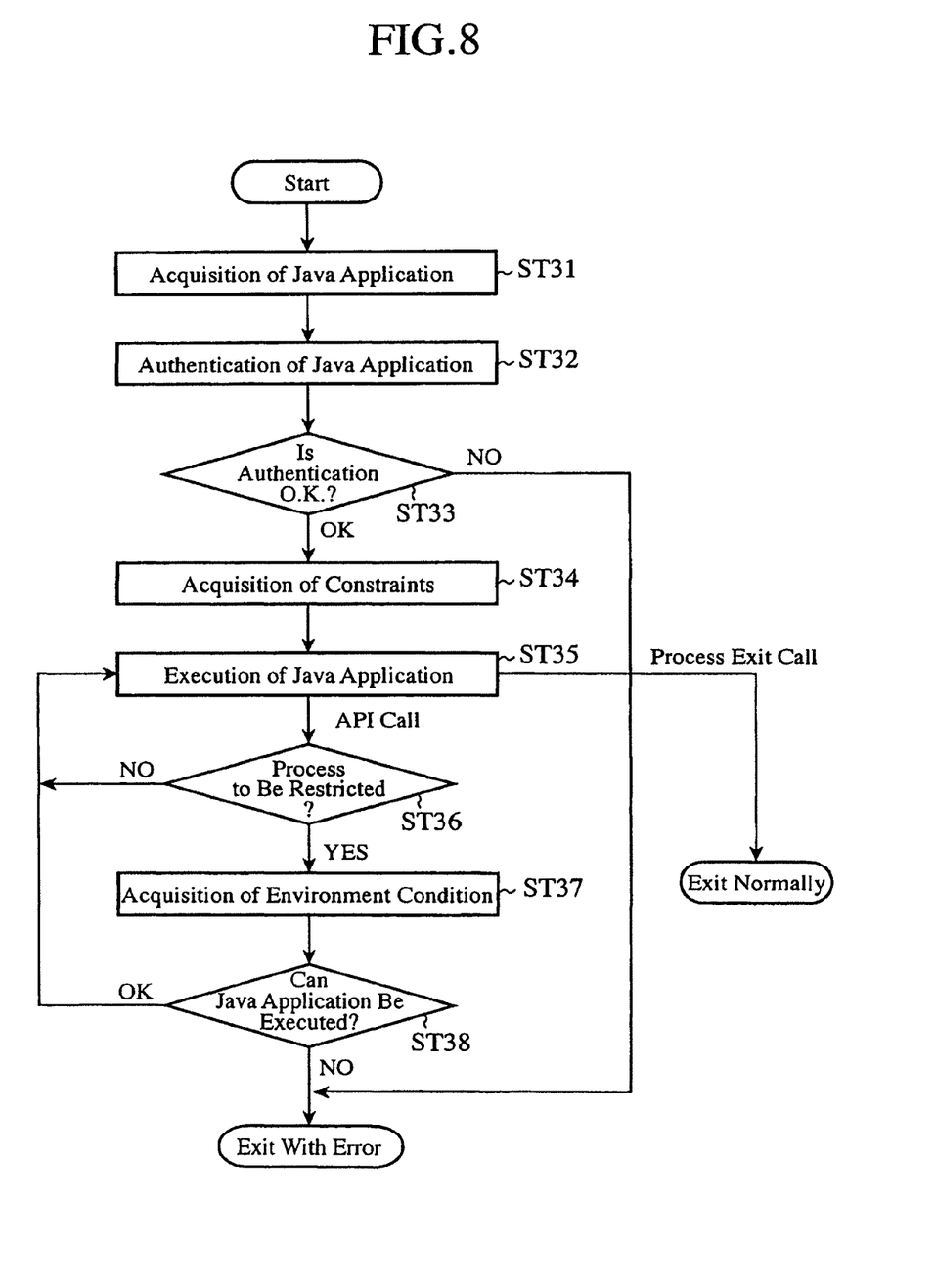
FIG. 8 is a flow chart showing a procedure for executing a Java application which the car navigation apparatus which is provided as a vehicle-mounted information system in accordance with embodiment 2 of the present invention follows, the Java application being provided by the program providing device.

Next, an operation of authenticating the authentication information generated by the program providing device, and executing a Java application, which is carried out by the car navigation apparatus will be explained with reference to the flow chart shown in FIG. 8.

First, a Java application is acquired (step ST31). Concretely, the car navigation apparatus receives a Java application and the authentication information via the communication equipment 61 (refer to FIG. 1). In this case, the communication equipment 61 corresponds to a program receiving means of the vehicle-mounted information system in accordance with the present invention, and the Java application which is received by this communication equipment 61 corresponds to a program. The received Java application is set as the Java application 11.

The Java application is then authenticated (step ST32). That is, the Java application authentication unit 14 authenticates the received authentication information. As an authentication method which the Java application authentication unit 14 uses, a method of decrypting the authentication information encrypted using a key which is beforehand prepared for the Java application authentication unit 14 can be used. Whether or not the authentication is proper (O.K.) is then checked to see (step ST33). That is, the Java application execution unit 12 checks to see whether or not the authentication result sent from the Java application authentication unit 14 is improper. When, in this step ST33, judging that the authentication is improper, the Java application execution unit ends the processing without executing the Java application.

In contrast, when, in step ST33, judging that the authentication is proper, the Java application execution unit then acquires the constraints (step ST34). That is, when judging that the authentication is proper, the Java application execution unit 12 acquires the constraints from the authentication information and sends them to the Java application execution restriction unit 15. The Java application is then executed (step ST35). That is, the Java application execution unit 12 executes the Java application 11. At this time, the Java application execution restriction unit 15 restricts the operation of the Java application 11 according to the constraints acquired in step ST34. The application exits normally when an exit process of the application is called.

When the API is then called as restrictions on the operation of the Java application during the application's execution, whether the process is a process to be restricted is checked to see (step ST36). That is, whether the process is a process to be performed on resources written in the constraints is checked to see. When, in this step ST36, it is judged that the process is not a process to be restricted, the sequence is made to return to step ST35 and the above-mentioned process is repeated. In contrast, when, in step ST36, it is judged that the process is a process to be restricted, the environment conditions are then acquired (step ST37). That is, the Java application execution unit 12 acquires the environment conditions from the navigation service 10.

Whether the Java application can be executed is then checked to see (step ST38). That is, the Java application execution unit 12 checks to see whether the Java application can be executed on the basis of the environment conditions acquired in step ST37. When, in this step ST38, it is judged that the Java application can be executed, the sequence is made to return to step ST35 and the above-mentioned process is repeated. In contrast, when, in step ST38, it is judged that the Java application cannot be executed, the process exits with error.

As previously explained, in accordance with embodiment 2 of the present invention, because constraints are attached to a Java application received, the car navigation apparatus can know the operating environment in which the Java application is to be executed. Therefore, the user of the car navigation apparatus can be notified of whether the Java application can be executed if it is placed in which state. As a result, by, for example, notifying the user that a Java application A acquired from the car maker can run also during traveling, but a Java application B acquired from a content provider can run only during standing still, the car navigation apparatus can prevent the user from having an intention of operating the Java application B during traveling.

A detailed operating environment of the software resources such as an operating environment in which in order to execute a service application C, a library C must be provided and a service application D must be being executed, and a detailed operating environment of the hardware resources such as an operating environment in which in order to execute the service application C, what amount of free space of the hard disk and what amount of free space of the memory must be provided and the load of the CPU must be equal to or lower than a certain percentage can be notified to the user.

The authentication information received via the communication equipment 61 can include the resource states containing at least one of the CPU usage, the memory usage, the hard disk usage, the bus usage, and the enable or disable of use of the network, and the environment conditions containing at least one of the traveling state indicating whether the vehicle is traveling or standing still, travelling speed, position, direction, and altitude of the vehicle, temperature, humidity, weather, and the type of the road along which the vehicle is traveling. According to this structure, because the environment conditions and the resource states of the hardware are included as the authentication information, the vehicle-mounted information system can determine a state in which the target program can run with security.

The authentication information received via the communication equipment 61 can include the resource states containing at least one of enable or disable of use of the API, enable or disable of use of the library, and the state of execution of a specific program, and the environment conditions containing at least one of the traveling state indicating whether the vehicle is traveling or standing still, travelling speed, position, direction, and altitude of the vehicle, temperature, humidity, weather, and the type of the road along which the vehicle is traveling. According to this structure, because the environment conditions and the resource states of the software are included as the authentication information, the vehicle-mounted information system can determine a state in which the target program can run with security.

Embodiment 3

In accordance with embodiment 3 of the present invention, provider information is embedded into authentication information. This embodiment 3 differs from embodiment 1 in the authentication method which the authentication unit 23 of the Java application operation test program 20 uses, and the software configuration of the car navigation apparatus. Hereafter, the difference between this embodiment and embodiment 1 will be explained mainly.

The authentication unit 23 of the operation test program 20 which constructs the program providing device generates authentication information containing information on the provider of a Java application. For example, a key which the authentication unit 23 has differs for every provider and a signature is written on the authentication information or the authentication information is encrypted using this key so that the information on the provider can be embedded into the authentication information.

Figure 9:
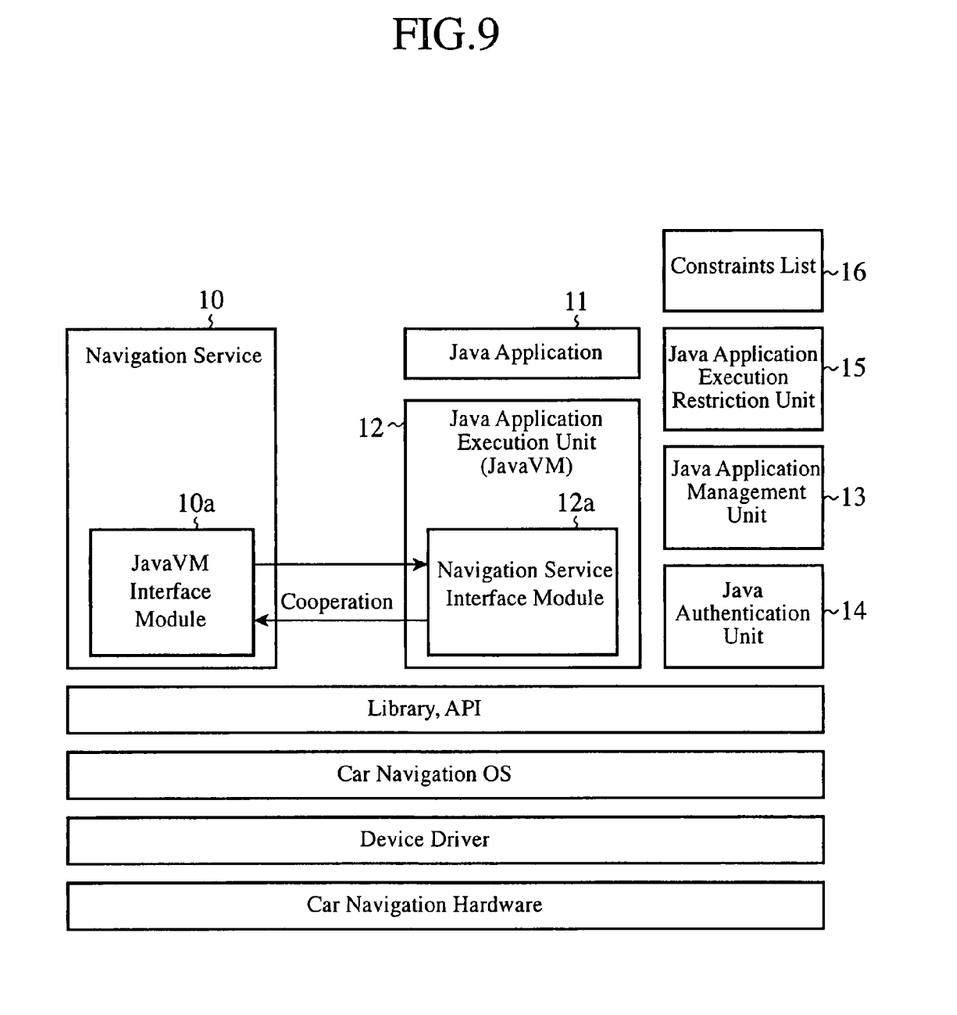
FIG. 9 is a diagram showing the software configuration of a car navigation apparatus which is a vehicle-mounted information system in accordance with embodiment 3 of the present invention.

FIG. 9 is a diagram showing the software configuration of the car navigation apparatus in accordance with embodiment 3 of the present invention. This software configuration is constructed in such a way that a constraints list 16 is added to the software configuration of the car navigation apparatus in accordance with embodiment 2. This constraints list 16 corresponds to a constraints acquiring means of the present invention, and defines an operation according to the type of the key.

Figure 10:
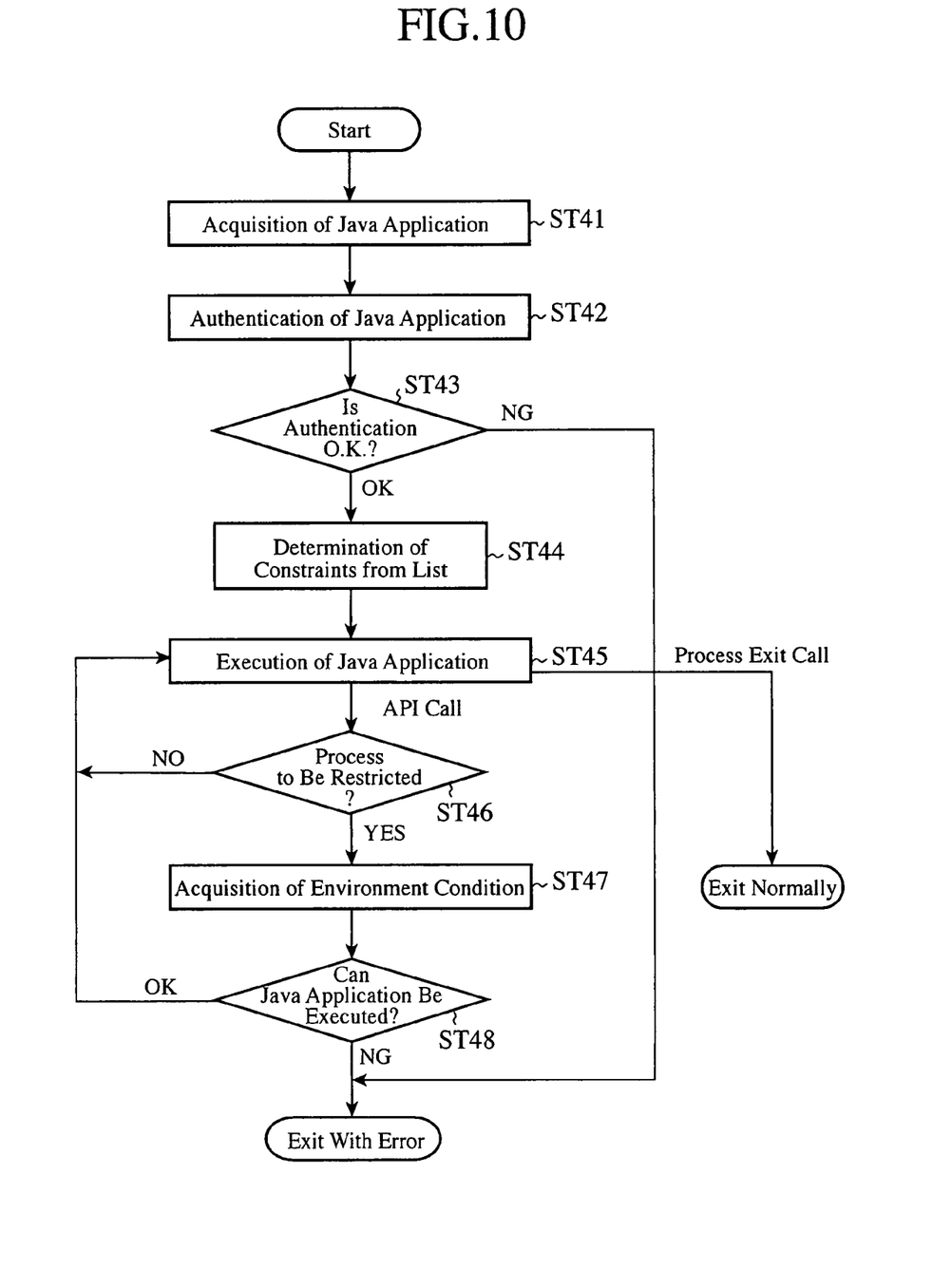
FIG. 10 is a flow chart showing a procedure for executing a Java application which the car navigation apparatus which is provided as a vehicle-mounted information system in accordance with embodiment 3 of the present invention follows, the Java application being provided by the program providing device.

Next, an operation of authenticating authentication information which is generated in the above-mentioned way and executing a Java application, which is performed by the car navigation apparatus, will be explained with reference to a flow chart shown in FIG. 10.

First, a Java application is acquired (step ST41). Concretely, the car navigation apparatus receives a Java application and authentication information via the communication equipment 61 (refer to FIG. 1). In this case, the communication equipment 61 corresponds to a program receiving means of the vehicle-mounted information system in accordance with the present invention, and the Java application which is received by this communication equipment 61 corresponds to a program. The received Java application is set as the Java application 11.

The Java application is then authenticated (step ST42) That is, the Java application authentication unit 14 authenticates the received authentication information. As an authentication method which the Java application authentication unit 14 uses, a method of decrypting the authentication information encrypted using a key dependent upon the provider which is beforehand prepared for the Java application authentication unit 14 can be used. At this time, the provider of the Java application can be identified from the key which has succeeded in decrypting the authentication information.

Whether or not the authentication is proper (O.K.) is then checked to see (step ST43). That is, the Java application execution unit 12 checks to see whether or not the authentication result sent from the Java application authentication unit 14 is improper. When, in this step ST43, judging that the authentication is improper, the Java application execution unit ends the processing with error and without executing the Java application. In contrast, when, in step ST43, judging that the authentication is proper, the Java application execution unit then selects corresponding constraints from the constraints list 16 on the basis of the result of the identification of the provider of the Java application (step ST44). That is, when judging that the authentication result is proper, the Java application execution unit 12 acquires constraints from the constraints list 16, and sends them to the Java application execution restriction unit 15.

The Java application is then executed (step ST45). That is, the Java application execution unit 12 executes the Java application. At this time, the Java application execution restriction unit 15 restricts the operation of the Java application according to the constraints acquired in step ST44. The application exits normally when an exit process of the application is called.

When the API is then called as restrictions on the operation of the Java application during the application's execution, whether the process is a process to be restricted is checked to see (step ST46). That is, whether the process is a process to be performed on resources written in the constraints is checked to see. When, in this step ST46, it is judged that the process is not a process to be restricted, the sequence is made to return to step ST45 and the above-mentioned process is repeated. In contrast, when, in step ST46, it is judged that the process is a process to be restricted, the environment conditions are then acquired (step ST47). That is, the Java application execution unit 12 acquires the environment conditions from the navigation service 10.

Whether the Java application can be executed is then checked to see (step ST48). That is, the Java application execution unit 12 checks to see whether the Java application can be executed on the basis of the environment conditions acquired in step ST47. When, in this step ST48, it is judged that the Java application can be executed, the sequence is made to return to step ST45 and the above-mentioned process is repeated. In contrast, when, in step ST48, it is judged that the Java application cannot be executed, the process exits with error.

As explained above, because the program providing device in accordance with embodiment 3 of the present invention is so constructed as to identify the provider of an application from the constraints list which the vehicle-mounted information system possesses beforehand as authentication information, it can impose restrictions according to the provider on the operation of the application. Because only information on the provider is written in the Java application, even when there are a large volume of data having constraints due to detailed operation settings, the cost required for communications can be reduced. When a change is made to the operating environment of the Java application after the operation test program is distributed, the change can be dealt with by updating the constraints list currently recorded into the car navigation apparatus.

In accordance with above-mentioned embodiment 3, the type of the key is used as a method of identifying the provider of the Java application. As an alternative, information indicating the provider, for example, data in which an ID, a URL, a name, or the like is recorded can be attached to the Java application.

In above-mentioned embodiments 1 to 3, the program to be developed which is explained above is a Java application. As an alternative, the program to be developed can be a native application written in, for example, the C language. Because the program providing device in accordance with any of embodiments 1 to 3 is a program which is executed on a personal computer, this program can be distributed with it being stored in a recording medium.

INDUSTRIAL APPLICABILITY

As mentioned above, the program providing device and the storage medium in accordance with the present invention are suitable for a verification and a provision of a program which is developed for vehicle-mounted information systems, and the vehicle-mounted information system in accordance with the present invention is suitable for execution of the program provided by the program providing device.

The invention claimed is:

1. A program providing device comprising:
   an emulation unit for emulating a hardware environment and a software environment of a vehicle-mounted information system;
   a program receiving unit for receiving a program which is developed for the vehicle-mounted information system;
   a memory for storing the program received by said program receiving unit;
   a constraints holding unit for holding, as constraints, resource states and environment conditions of the vehicle-mounted information system;
   a program execution restricting unit for restricting an operation of said program on a basis of the constraints held by said constraint holding unit; and
   a program execution unit for executing the program received by said program receiving unit and stored in the memory by using resources provided by said emulation unit according to the restrictions provided by said program execution restricting unit,
   wherein the environment conditions under which said program is executed are switchable in order to use said program execution unit to verify whether said program is executable under different sets of environment conditions that could occur in said vehicle-mounted information system.

2. The program providing device according to claim 1, wherein the resource states included in the constraints held by the constraint holding unit include at least one of a CPU usage, a memory usage, a hard disk usage, a bus usage, and enable or disable of use of a network, and the environment conditions include at least one of a traveling state indicating whether a vehicle is traveling or standing still, a travelling speed, a position, a direction, an altitude, temperature, humidity, weather, and a road type.

3. The program providing device according to claim 1, wherein the resource states included in the constraints held by the constraint holding unit include at least one of enable or disable of use of an application program interface, enable or disable of use of a library, and a state of execution of a specific program, and the environment conditions include at least one of a traveling state indicating whether a vehicle is traveling or standing still, a travelling speed, a position, a direction, an altitude, temperature, humidity, weather, and a road type.

4. The program providing device according to claim 1, wherein said device comprises a constraints updating unit for updating the constraints held by the constraint holding unit.

5. The program providing device according to claim 1, wherein said device comprises a program authentication unit for generating authentication information authenticating that the program is normally executed by the program execution unit, and the memory stores the authentication information generated by said program authentication unit.

6. The program providing device according to claim 1, wherein said device comprises a program authentication unit for generating authentication information proving that the program is normally executed by the program execution means, and a program transmitting unit for transmitting the program which is authenticated to be executed normally by said program authentication unit, and the authentication information generated by said program authentication unit to outside the program providing device.

7. The program providing device according to claim 5, wherein the program authentication unit generates authentication information according to the constraints including the resource states having at least one of a CPU usage, a memory usage, a hard disk usage, a bus usage, and enable or disable of use of a network, and the environment conditions having at least one of a traveling state indicating whether a vehicle is traveling or standing still, a travelling speed, a position, a direction, an altitude, temperature, humidity, weather, and a road type.

8. The program providing device according to claim 5, wherein the program authentication unit generates authentication information according to the constraints including the resource states having at least one of enable or disable of use of an application program interface, enable or disable of use of a library, and a state of execution of a specific program, and the environment conditions having at least one of a traveling state indicating whether a vehicle is traveling or standing still, a travelling speed, a position, a direction, an altitude, temperature, humidity, weather, and a road type.

9. The program providing device according to claim 5, wherein the program authentication unit generates authentication information according to a program provider.

10. A non-transitory storage medium which stores a program which can be executed by a computer to perform a process comprising: emulating a hardware environment and a software environment of a vehicle-mounted information system; receiving a program which is developed for the vehicle-mounted information system; holding, as constraints, resource states and environment conditions of the vehicle-mounted information system; restricting an operation of said program on a basis of a first set of environment conditions; executing the received program by using resources provided by said emulated hardware and software environments according to the restrictions based on the first set of environment conditions; restricting an operation of said program on the basis of a second set of environment conditions which differs from the first set; and re-executing the received program by using resources provided by said emulated hardware and software environments according to the restrictions based on the second set of environment conditions, wherein the received program is executed and re-executed in accordance with the first set and the second set of environment conditions, respectively, in order to verify whether the received program is executable under different sets of environment conditions that could occur in said vehicle-mounted information system.

* * * * *